United States Patent [19]

Naffziger

[11] 4,214,988
[45] Jul. 29, 1980

[54] DITCH WATER CLEANING APPARATUS

[76] Inventor: John D. Naffziger, Rte. 1, P.O. Box 34, Loma, Colo. 81524

[21] Appl. No.: 900,417

[22] Filed: Apr. 27, 1978

[51] Int. Cl.² .............................................. B01D 35/16
[52] U.S. Cl. .................................. 210/159; 15/21 R; 210/170; 210/407; 210/413
[58] Field of Search ................ 15/21 R, 77; 210/159, 210/170, 354, 355, 407, 413

[56] References Cited

U.S. PATENT DOCUMENTS

| | | | |
|---|---|---|---|
| 192,313 | 6/1877 | Watson | 210/355 |
| 414,887 | 11/1889 | Rakes et al. | 210/159 |
| 4,042,506 | 8/1977 | Wilson | 210/159 X |

Primary Examiner—Charles N. Hart
Assistant Examiner—Richard W. Burks

Attorney, Agent, or Firm—Edwin L. Spangler, Jr.

[57] ABSTRACT

This invention relates to an improved ditch water cleaning apparatus characterized by a partially covered open ended frame for insertion in the ditch, an upwardly and rearwardly inclined screen at the upstream end of the frame effective to interrupt the flow of water within the ditch and screen the debris therefrom, a propeller-like brush journalled for rotation about an axis normal to the plane of the screen and so located relative thereto that each arm of the brush successively sweeps the surface of the latter and removes any debris therefrom onto the covered portion of the frame lying immediately therebehind, and brush drive means operatively connected to the brush. The unit also includes a novel comb to pick the debris from the brush bristles preparatory to its moving onto the screen.

5 Claims, 3 Drawing Figures

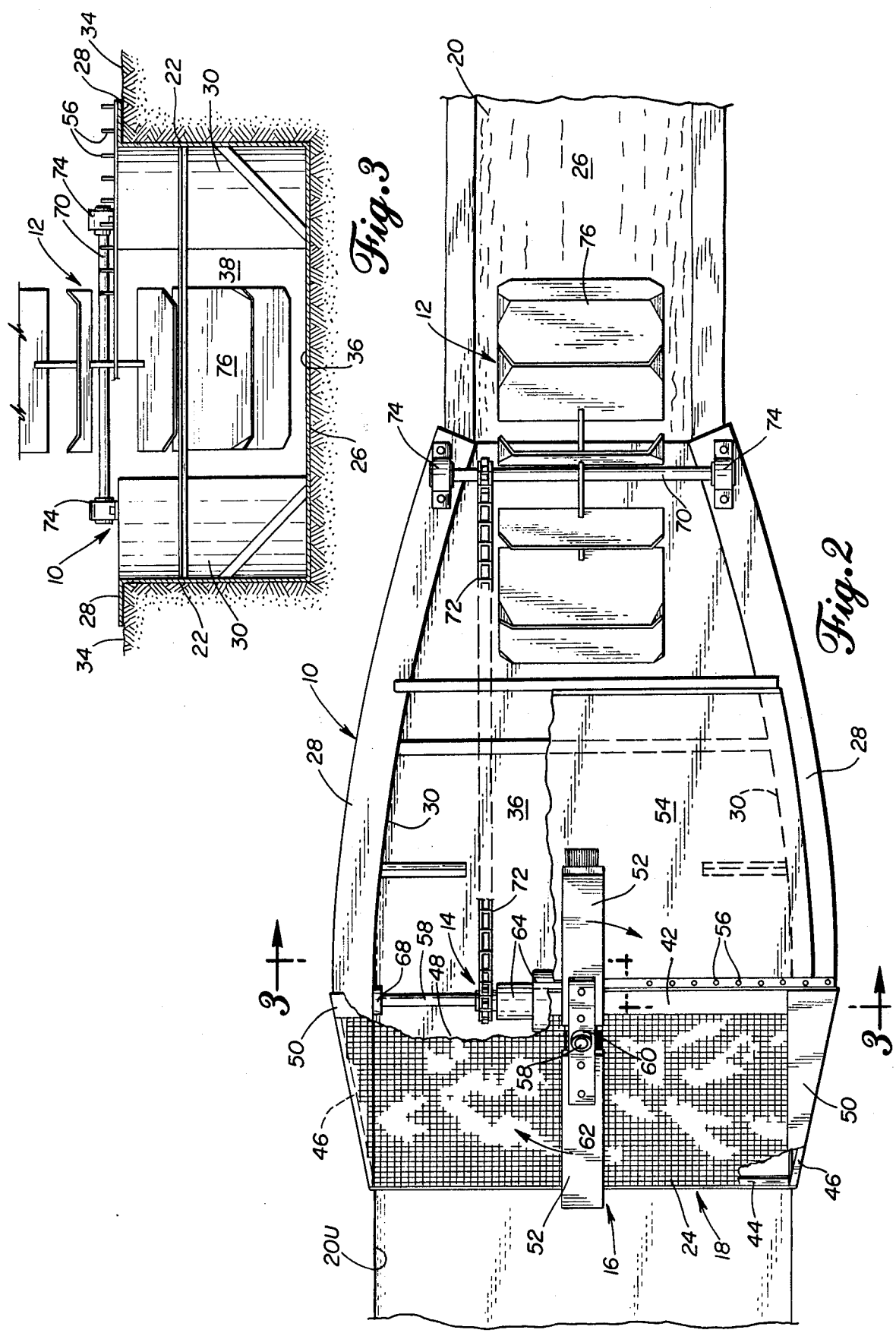

DITCH WATER CLEANING APPARATUS

Many farms and ranches, especially those in the arid sections of the West, must be irrigated due to the insufficiency of natural rainfall. Various and sundry types of irrigation systems are in common use ranging all the way from canvas dams temporarily located in an irrigation ditch to huge water powered travelling sprinklers supplied with water pumped at high pressure from an underground well that cost upwards of twenty thousand dollars for a large installation. Between these extremes lie other systems much less expensive than the travelling sprinkler but, by the same token, more efficient than the simple ditch overflow systems. For present purposes, these systems will be characterized as those which utilize some sort of sprinkler or other pluggable element for distributing the water yet, at the same time, utilize ditch water to supply same. Obviously, a source of relatively clean debris-free water is essential if the distribution system as well as the pumps supplying it are to operate as intended. It is to an apparatus for removing debris from flowing ditch water that the present invention relates.

So far as applicant is aware, the closest prior art to his ditch water screening apparatus is a paddlewheel powered mechanism manufactured in Berthoud, Colorado by the Lebsack Brothers under the trademark "HYDROSCREEN". Common to both the prior art unit and that forming the subject matter of the instant invention is an open ended frame having an upwardly and rearwardly inclined coarse meshed screen at the lead or upstream end thereof, a trash depository in the form of a platform immediately behind the screen, one or more brushes movable over the surface of the screen to sweep the debris therefrom and up onto the platform, and a brush drive mechanism operatively connected to the travelling brushes. One fundamental difference between the two lies in the character of the brushes and the way they move across the surface of the screen. Another deals with the mechanical details of the system, particularly with reference to location of the bearings and the shielding of the brush drive mechanisms. Still another relates to the means for keeping the brushes free of debris.

In the prior art device, longitudinally-spaced tranversely-extending shafts are disposed in parallel relation to one another atop the trough with a shaft at the front or upstream end being located adjacent the leading edge of the screen while the other shaft is positioned at or even well beyond its travelling edge. These shafts mount longitudinally-aligned pairs of sprockets about which are reaved endless sprocket chains. Extending between these sprocket chains and fastened for movement therewith are a series of essentially parallel brushes, each mounted with its bristles facing outwardly. As the trailing shaft is driven by the paddlewheel, the brushes, one after another, sweep any debris that has collected on the screen from the bottom up onto the collection platform. The brushes maintain their parallel relationship at all times and their movement across the screen is linear as opposed to rotational.

The instant apparatus differs from the prior art unit just described primarily in the manner in which the brushes are mounted and how they move across the screen. More specifically, two or more brushes extend radially outward propeller-fashion from a central hub and each brush in turn sweeps the surface of the screen with an arcuate motion much like that of a windshield wiper except that they do not oscillate back and forth, but instead, continue to rotate all the way around.

While both machines function quite well for their intended purpose, certain advantages do, in fact, result from the use of the rotary as opposed to the linear brushes. To begin with, and most important, the mounting for the rotating brushes is a rigid one thus continually holding the bristles into continuous sweeping contact with the screen. The chain-mounted bristles of the prior art unit, on the other hand, are free to wobble and even ride up over pieces of debris stuck in the screen apertures due to the inherent slack present in any length run of chain. Essentially, therefore, the prior art brushes are held against the screen by their own weight and that of the chain; whereas, those of the present invention are held tightly thereagainst by a rigid mounting. In fact, if the circumstances demanded, the instant brushes could be biased against the screen.

Another advantage of the instant device is the fact that all of its shaft bearings lie above the level of the water flowing through the trough. By way of contrast, four of the six bearings in the prior art unit are submerged.

Also, by driving the brushes from underneath the roof covering part of the trough, the power train components are much more easily protected from contaminants than those exposed to the elements. The prior art drive train is not only exposed to the elements, it lies in close proximity and fully exposed to the very debris that the system is designed to screen out such as, for example, grass and weeds that can easily foul the chains and sprockets.

Additionally, the prior art unit includes no provision for cleaning debris from the brush bristles which, in due course, become clogged and their effectiveness is reduced. The unit described and claimed herein, on the other hand, combs the debris from the bristles on each pass just before they begin their excursion across the surface of the screen.

Furthermore, the prior art unit is limited in the size of the material it can sweep off the screen to that which will pass underneath the shafts and other overhead members that form a part of the brush drive subassembly. The unit forming the subject matter of the instant invention, on the other hand, is no way limited in this respect.

It is, therefore, the principal object of the present invention to provide a novel and improved self-cleaning ditch water screening apparatus.

A second objective is the provision of a device of the character described which employs a more positive screen-sweeping action than the prior art water wheel powered unit for the same purpose.

Another object is to provide a piece of equipment of the type herein disclosed and claimed which is effective and efficient insofar as the removal of solid debris from the flowing ditch water is concerned; yet, it requires little attention and may, in fact, be left unattended for days at a time.

Still another objective of the within described invention is to enclose or otherwise protect all moving parts in contact with the screened out debris other than the brush subassembly itself while, at the same time, locating all the bearings above the level of the water coarsing through the trough.

An additional objective is the provision of a ditch water cleaning apparatus that includes provision for combing the debris from the brush bristles before they return to the screen.

Further objects are to provide a device for screening solid debris from flowing ditch water which is simple to install; versatile; dependable; readily adaptable to various sizes, types and styles of ditch systems; one that is relatively inexpensive, yet well built; and, a unit that is even somewhat decorative.

Other objects will be in part apparent and in part pointed out specifically hereinafter in connection with the description of the drawings that follows, and in which:

FIG. 2 is a top plan view to the same scale as FIG. 1 showing a portion of the roof covering the trough broken away to expose the interior of the latter; and, FIG. 3 is a transverse section taken along line 3—3 of FIG. 2, also to the same scale.

Figure 1:
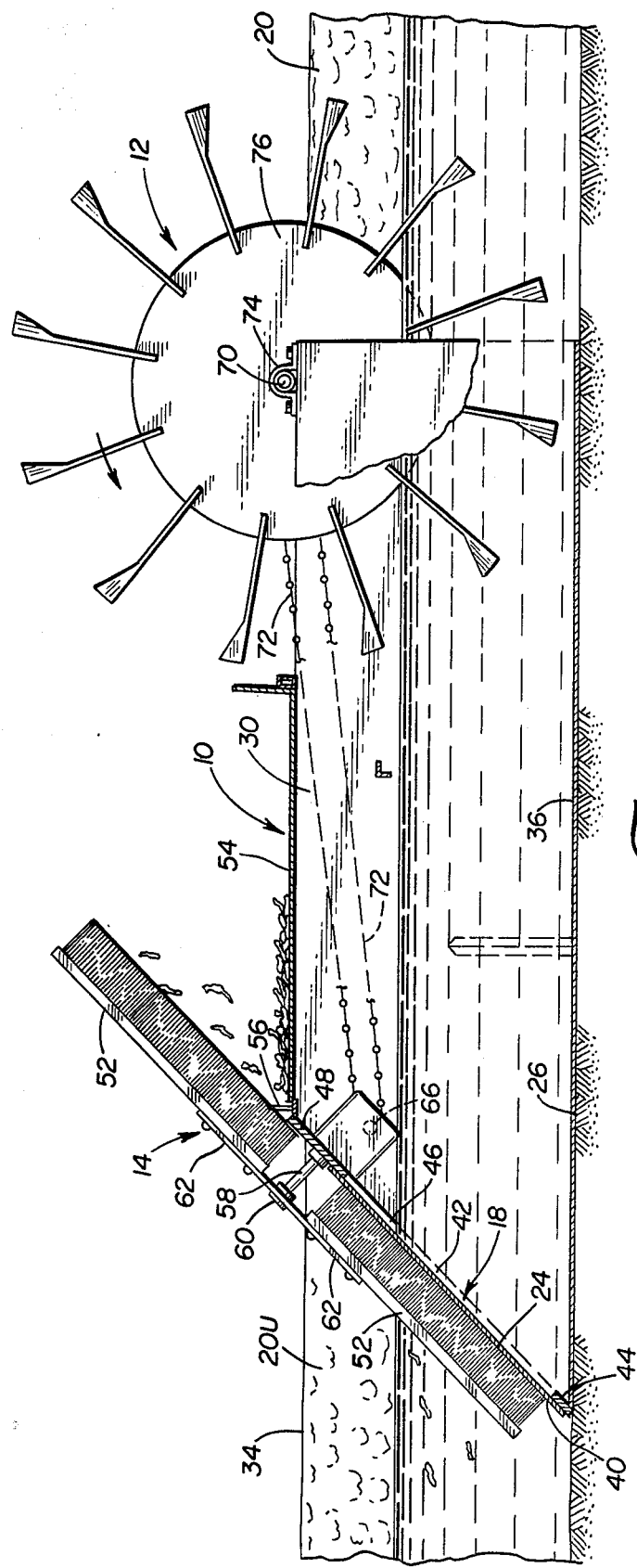
FIG. 1 is a side elevation of the ditch water cleaning apparatus showing the near side of the trough broken away to better reveal the interior construction.

Referring next to the drawings for a detailed description of the present invention, reference numeral 10 has been chosen to broadly designate the ditch water cleaning apparatus in its entirety while numerals 12, 14, 16 and 18 similarly designate the paddlewheel subassembly, the brush subassembly, the power transmission subassembly operatively interconnecting the latter, and the screen subassembly, respectively. Reference numeral 20 represents a conventional farm or ranchland irrigation ditch consisting of a trench dug into the ground for the purpose of carrying water into and through the fields. The one shown has earthen walls which, in some instances, may be treated to prevent errosion and seepage. Many such ditches are lined with concrete but, regardless of their construction, the function thereof remains the same, namely, the transporting of irrigation water from one place in the fields to another.

In the particular form shown, the ditch is widened and contoured to form a shaped pocket 22 within which the screening apparatus 10 sits. The portion of the ditch 20U upstream of the unit is also shown widened out to accommodate and utilize the full width of screen 24. Generally speaking, the size and shape of the pocket 22 is such as to permit the unit to rest on the ditch bottom 26 with the upper outturned flanges 28 on the side walls 30 of the trough 32 essentially flush with the ditch banks 34.

The side walls 30 of the trough 32 are perpendicular to the bottom 36 thereof in the particular form shown although they converge downstream to define a relatively narrower throat 38 where the paddlewheel subassembly 12 is mounted. The upstream or leading edges 40 of these side walls 30 are cut on the bias so as to slope upwardly and rearwardly at approximately an angle of 45° in transversely-spaced parallel relation to one another as most clearly shown in FIG. 1.

Next, with particular reference to FIG. 1, shown resting against and fastened to these sloping side wall edges 40 is an open generally trapezoidal-shaped screen frame 42. The lower horizontal element 44 of this frame terminates essentially flush with the side walls 30 of the trough while the side frame elements 46 diverge slightly so as to terminate flush with the outside margins of trough side wall flanges 28. The upper horizontal screen frame element 48 is quite wide and designed to both accommodate and support the brush subassembly 14 to be described in detail presently. In the particular form illustrated, the screen 24 is bolted or otherwise removably fastened to the frame with a triangular piece of flashing 50 overlaying it on one side while a similarly-shaped piece of flashing is placed between the screen and frame on the other. The overlying flashing greets the leading edge of the brushes 52 which rotate clockwise as shown in FIG. 1 thus carrying their bristles onto the surface of the screen smoothly and easily. The underlying flashing on the other side provides no obstruction to the sweeping action of the brushes as they push debris deposited on the screen up and over the edge of the frame 42 and onto roof 54 partially covering the trough ahead of paddlewheel subassembly 12. Screen 24 is of a coarse heavy gauge metal construction capable of withstanding the abuse of branches and other heavy refuse striking same as they are carried along with the flowing ditch water.

Returning again to all three figures of the drawing, another novel feature of the unit is worthy of special mention, namely, the comb 56 along that section of the top edge of the screen frame that first receives the brushes 52 just before they move over the flashing 50 and onto the screen. This comb is nothing more than a plurality of transversely-spaced upstanding spikes that engage the brush bristles and comb any debris therefrom so that it will not be returned to the screen. No such comb is provided on the other side of the frame for the simple reason that it would comb the debris from the brushes and return it to the screen instead of the roof 54 of the trough.

Next, in connection with FIGS. 1 and 2, the brush subassembly 14 will be seen to include a shaft 58 journalled for rotation in upper element 48 of the screen frame 42 midway between the side margins of the latter. The axis of this shaft is normal to the plane of the screen 24 and it includes a hub member 60 from which blades 62 radiate for rotation therewith. Blades 62 lie spaced above the surface of the screen and they mount and hold the brushes 52 against the surface of the latter as they sweep thereacross. These blades do not bias the brushes against the screen although they can easily be fabricated from spring steel so that they become effective to do so. The disadvantage of such an arrangement is the increased friction between the brushes and screen that could easily avert at the power available from a paddlewheel drive.

The particular brush arrangement shown utilizes only two brushes arranged one opposite the other in straight-line propeller-like fashion. Three or more equiangularly-spaced blades could also be used and should be used if two prove ineffective to remove the debris collecting on the screen fast enough. Here again, the more brushes, the greater the load on the paddlewheel engine.

Shaft 58 comprises the output shaft of a conventional right-angle drive mechanism that has been designated by reference numeral 64 and which forms a part of the power transmission subassembly 16. The input shaft 66 to this right-angle drive extends transversely of the trough where it is journalled for rotation in suitable antifriction bearings 68 carried on the inside of the side walls 30. The paddlewheel shaft 70 parallels the latter and is operatively connected thereto by a conventional chain and sprocket power transfer mechanism indicated by reference numeral 72 and which also comprises an integral part of the power transmission subassembly 16.

The significance of this power transmission subassembly lies in the fact that it is almost completely sheltered and protected inside the trough and underneath the partial roof 54 covering same. At no time is any element of the power train subjected to any of the debris impinging against or swept off the screen. Instead, the most that the power train sees in the way of contaminants is clean ditch water and the natural elements.

Finally, it can be seen that the paddlewheel shaft 70 is mounted for rotation about a transverse axis extending across the narrowed throat 38 of the trough on a pair of pillow blocks 74 fastened atop the side wall flanges. These paddlewheel shaft bearings lie well above the water level as does the bearing mounting the brush shaft. The paddlewheel 76 is of conventional design and its sole function is that of supplying power to shaft 70 under the influence of clean ditch water flowing through the throat of the trough. It is mounted in the uncovered downstream end of the trough behind the roofed-over portion upon which the debris swept from the screen is deposited. It should, perhaps, be mentioned that while, the unit illustrated is shown powered by a paddlewheel, it is by no means limited to such a prime mover. On the contrary, a paddlewheel becomes impractical in large irrigation systems and alternate sources of power like electric motors and gasoline engines are envisioned.

What is claimed is:

1. In a ditch water cleaning apparatus of the type including an open ended frame having an intake end mountable in the ditch effective to channel the water therethrough, and an upwardly and rearwardly inclined screen located at the intake end of the frame sized and adapted to remove solid debris from the ditch water, the improved means for constantly removing the debris collected on the screens which comprises: a shaft journalled for rotation adjacent the top of the screen in substantially perpendicular relation thereto, at least two brushes fastened to the shaft for rotation therewith and extending radially outward therefrom in position to successively sweep the surface thereof with a wiping action, brush drive means connected to the brushes and operative to rotate the latter, said brushes being positioned to move off of said screen during a portion of said brush rotation to move debris off of said screen, and stationary brush cleaning means positioned adjacent one edge of said screen to intercept said brushes just prior to said brushes moving back onto said screen to remove debris from said brushes prior to said brushes moving back onto said screen.

2. The improved ditch water cleaning apparatus as set forth in claim 1 which includes a roof partially covering the frame so located relative to the brushes as to define a platform for receiving and collecting the debris swept off the screen.

3. The improved ditch water cleaning apparatus defined in claim 1 wherein said brushes include two brushes which radiate in opposite directions from one another to define a propeller-like subassembly.

4. The improved ditch water cleaning apparatus as set forth in claim 1 wherein the brushes have bristles on the surface thereof sweeping the screen, and in which said stationary brush cleaning apparatus includes comb-forming means disposed along the top edge of the screen, said comb-forming means including upstanding tines.

5. The improved ditch water cleaning apparatus as set forth in claim 2 in which said roof defines a protective covering over the brush drive means effectively isolating the latter from the debris collected from the ditch water.

* * * * *